Patented Sept. 14, 1954

2,689,264

UNITED STATES PATENT OFFICE 2,689,264

ALKALI METAL AND ALKALINE EARTH METAL DERIVATIVES OF 5,8-DIHYDRO - 4 - HYDROXY - 3 - ALKOXY- 8a - METHYL-1-NAPHTHALENONE

Quentin E. Thompson, St. Louis, Mo., assignor to Monsanto Chemical Company, St. Louis, Mo., a corporation of Delaware No Drawing. Application October 27, 1951, Serial No. 253,554

5 Claims. (Cl. 260—586)

This invention relates to derivatives of the enol form of 4a,5,8,8a-tetrahydro-2-alkoxy-4a-methyl-1,4-naphthoquinones. More specifically, this invention relates to alkali metal and alkaline earth metal derivatives of 5,8-dihydro-4-hydroxy-3-alkoxy-8a-methyl - 1 - naphthalenone wherein the alkoxy group contains from 1 to 5 carbon atoms, and to a method for their preparation. The compounds of this invention may be represented by the following formula

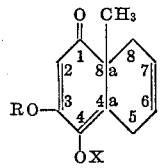

wherein R represents an alkyl radical containing from 1 to 5 carbon atoms and X represents an alkali metal or an alkaline earth metal. In the case of the bivalent alkaline earth metals, two molecular proportions of the organic compound are combined with each atom of the alkaline earth metal.

The compounds of this invention are exceptionally useful intermediates for the preparation of various pharmaceuticals. These compounds exist in two optically active forms, namely the dextrorotary (d) and levo-rotary (l), and both forms and mixtures thereof are contemplated by this invention.

The compounds of this invention may be conveniently prepared by a process which comprises reacting a 4a,5,8,8a - tetrahydro - 2 - alkoxy-4a-methyl-1,4-naphthoquinone, wherein the alkoxy group contains from 1 to 5 carbon atoms, and an alkaline derivative of an alkali metal or an alkaline earth metal in an inert organic solvent. After the reaction is complete, the new compound may be recovered from the reaction mixture.

The 4a,5,8,8a-tetrahydro-2-alkoxy-4a-methyl-1,4-naphthoquinones utilized in the process described above may be represented by the formula

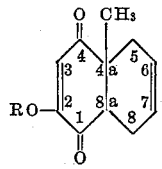

wherein R represents an alkyl radical containing from 1 to 5 carbon atoms. These compounds contain two asymmetric carbon atoms. As a result thereof, these compounds exist in four optically isomeric forms and two racemates. All such forms, or mixtures thereof, may be used to produce the compounds of this invention. The terms "cis" and "trans" as used in this specification indicate the spacial position of the CH₃ group and H at positions 4a and 8a in the structural formula set forth above.

The following examples are illustrative, but not limitative, of this invention.

Example I 1.21 g. of sodium is dissolved in 20 ml. of methanol. To this solution is added 10.85 g. of dl-trans-4a,5,8,8a-tetrahydro - 2-methoxy-4a-methyl-1,4-naphthoquinone while maintaining temperatures below 30° C. The resulting light brown liquid is then poured into approximately 500 ml. of boiling dioxane. The bright yellow sodium derivative separates immediately and is removed by filtration and dried by heating under reduced pressure. 11.6 g., representing a 96.7% yield, of the sodium derivative of dl-5,8-dihydro-4-hydroxy-3-methoxy-8a-methyl-1-naphthalenone is obtained.

The bright yellow sodium derivative is readily soluble in water and alcohols in which it gives a basic reaction. Neutralization of an aqueous solution of the derivative with an acid (using the disappearance of the yellow enolate color as the endpoint) results in the precipitation of dl-trans-4a,5,8,8a - tetrahydro-2-methoxy-4a-methyl-1,4-naphthoquinone having a melting point of 126°–127.5° C. The sodium derivative as prepared above has the following analysis:

| | Calculated | Found |
|---|---|---|
| Neutralization equivalent | 228.2 | 230.5 |

The above described sodium derivative is also prepared by adding 10 g. of dl-trans-4a,5,8,8a-tetrahydro-2-methoxy-4a - methyl-1,4-naphthoquinone to 17 ml. of methyl alcohol having dissolved therein 1.94 g. of sodium hydroxide while maintaining a temperature below 30° C. The resultant liquid is then poured into one liter of diethyl ether, precipitating the sodium derivative which is removed by filtration and dried by heating under reduced pressure. 9.0 g. of the sodium derivative of dl-5,8-dihydro-4-hydroxy-3-methoxy-8a-methyl-1-naphthalenone, representing a 90.5% yield, is recovered having the following analysis:

|  | Calculated | Found |
| --- | --- | --- |
| Neutralization equivalent | 228.2 | 235.0 |

Example II

The procedure set forth in Example I is repeated utilizing *dl*-cis-4a,5,8,8a-tetrahydro-2-methoxy-4a-methyl-1,4-naphthoquinone in place of the *dl*-trans-4a,5,8,8a-tetrahydro-2-methoxy-4a-methyl - 1,4 - naphthoquinone. An excellent yield of the sodium derivative of *dl*-5,8-dihydro-4-hydroxy-3-methoxy - 8a-methyl-1-naphthalenone is obtained.

Example III 10.0 g. of *dl*-trans - 4a,5,8,8a - tetrahydro-2-methoxy-4a-methyl-1,4-naphthoquinone is added to 12 ml. of methyl alcohol containing 2.72 g. of potassium hydroxide. The resultant solution is poured into two liters of anhydrous diethyl ether, precipitating the potassium derivative of *dl*-5,8-dihydro - 4 - hydroxy - 3 - methoxy-8a-methyl-1-naphthalenone. The yellow orange potassium derivative is recovered by filtration and dried overnight over calcium chloride under reduced pressure. 11.7 g. of the desired potassium derivative is obtained, representing a 99% yield.

Example IV 11.0 g. of *dl*-trans-4a,5,8,8a-tetrahydro-2-ethoxy-4a-methyl-1,4-naphthoquinone is added to 12 ml. of ethanol containing 4.11 g. of potassium ethoxide. The resulting solution is poured into two liters of anhydrous diethyl ether, precipitating the desired potassium derivative. An excellent yield of the bright yellow hygroscopic the potassium derivative of *dl*-5,8-dihydro-4-hydroxy-3-ethoxy-8a-methyl - 1 - naphthalenone is recovered.

Example V

The procedure set forth in Example IV is repeated utilizing the following ingredients:

4.99 g. of barium methoxide
20 ml. of methyl alcohol
11.7 g. of *d*-cis-4a,5,8,8a-tetrahydro-2-propoxy-4a-methyl-1,4-naphthoquinone An excellent yield of the substantially pure barium derivative of *d*-5,8-dihydro-4-hydroxy-3-propoxy-8a-methyl-1-naphthalenone is obtained when the reaction mixture is poured into 500 ml. of dioxane, precipitating the barium derivative which is recovered by filtration.

Example VI

The procedure set forth in Example IV is repeated utilizing the following ingredients:

3.25 g. of calcium ethoxide
25 ml. of ethyl alcohol
13.1 g. of *dl*-trans-4a,5,8,8a-tetrahydro-2-penttoxy-4a-methyl-1,4-naphthoquinone An excellent yield of the substantially pure calcium derivative of *dl*-5,8-dihydro-4-hydroxy-3-pentoxy-8a-methyl-1-naphthalenone is obtained when the reaction mixture is poured into 500 ml. of dioxane, precipitating the calcium derivative which is recovered by filtration.

Example VII

The procedure set forth in Example IV is repeated utilizing the following ingredients:

4.99 g. of barium methoxide
25 ml. of methyl alcohol
12.41 g. of *dl*-trans-4a,5,8,8a-tetrahydro-2-butoxy-4a-methyl-1,4-naphthoquinone An excellent yield of the substantially pure barium derivative of *dl*-5,8-dihydro-4-hydroxy-3-butoxy-8a-methyl-1-naphthalenone, is obtained when the reaction mixture is poured into two liters of anhydrous ethyl ether, precipitating the barium derivative which is recovered therefrom by filtration.

Example VIII 10.0 g. of *dl*-trans-4a,5,8,8a-tetrahydro-2-methoxy-4a-methyl-1,4-naphthoquinone is added to 46 ml. of methanol having dissolved therein 3.7 g. of barium oxide while maintaining a temperature below 30° C. The reaction mixture is then poured into one liter of anhydrous diethyl ether, precipitating the barium derivative of *dl*-5,8-dihydro-4-hydroxy-3-methoxy-8a-methyl-1-naphthalenone. The bright yellow barium derivative is recovered by filtration and dried by heating for one hour at 60° C. under reduced pressure. The barium derivative thus obtained has the following analysis:

|  | Calculated | Found |
| --- | --- | --- |
| Neutralization equivalent | 273.9 | 272.0 |

While the preceding examples have illustrated specific embodiments of this invention, substantial variation is possible in the quantities of reactants, reaction conditions, etc., without departing from the scope of this invention. For example, while approximately equivalent proportions of the alkaline derivative of the alkali metal or alkaline earth metal and the 4a,5,8,8a-tetrahydro-2-alkoxy-4a-methyl-1,4-naphthoquinone are preferred, an excess of either of these reactants may be utilized, if desired.

The reaction may also be carried out over a substantial temperature range. Reaction temperatures ranging from the freezing point of the reaction mixture to the boiling point of the reaction mixture may be utilized. Preferably, the reaction is carried out at a temperature in the range of from about 15° C. to about 50° C.

The reaction may be carried out in any inert organic solvent. The aliphatic alcohols are extremely useful in this capacity, and alkyl alcohols containing from 1 to 5 carbon atoms are particularly advantageous as the solvent reaction medium.

Any alkaline derivative of the alkali metal or alkaline earth metals may be used in this process. Typical of such compounds are the hydroxides of sodium, potassium and lithium and the hydroxides or oxides of calcium, barium and magnesium. Particularly outstanding results are obtained by utilizing the alkali metal or alkaline earth metal alkoxides. The use of the alkali metal and alkaline earth metal alkoxides containing from 1 to 5 carbon atoms constitutes a preferred embodiment of this invention.

After the reaction is complete, the alkali metal and alkaline earth metal salts of 5,8-dihydro-4-hydroxy-3-alkoxy-8a-methyl - 1 - naphthalenone may be recovered from the reaction mixture by any convenient method. A particularly convenient procedure comprises pouring the reaction mixture into a non-solvent for the derivative

What is claimed is:
1. The process of making derivatives of 5,8-dihydroxy-4-hydroxy-3-alkoxy-8a-methyl-1-naphthalenone of the structural formula

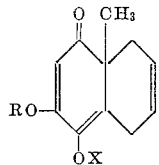

where R is an alkyl radical containing from 1 to 5 carbon atoms and where X is a member of the group consisting of alkali metals and alkaline earth metals which comprises reacting in an inert organic solvent a 4a,5,8,8a-tetrahydro-2-alkoxy-4a-methyl-1,4-naphthoquinone of the structural formula

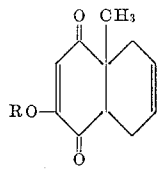

where R is an alkyl radical containing from 1 to 5 carbon atoms with a compound selected from the group consisting of an alkaline derivative of an alkali metal and an alkaline derivative of an alkaline earth metal at a temperature ranging from the freezing point of the reaction mixture to the boiling point of the reaction mixture.

2. The process of making a sodium derivative of 5,8-dihydro-4-hydroxy-3-alkoxy-8a-methyl-1-naphthalenone of the structural formula

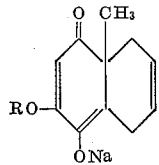

where R is an alkyl radical containing from 1 to 5 carbon atoms which comprises reacting in an alkyl alcohol solvent containing from 1 to 5 carbon atoms a 4a,5,8,8a-tetrahydro-2-alkoxy-4a-methyl-1,4-naphthoquinone of the structural formula

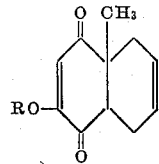

where R is an alkyl radical containing from 1 to 5 carbon atoms with a sodium alkoxide containing from 1 to 5 carbon atoms at a temperature ranging from the freezing point of the reaction mixture to the boiling point of the reaction mixture.

3. The process of making a potassium derivative of 5,8-dihydro-4-hydroxy-3-alkoxy-8a-methyl-1-naphthalenone of the structural formula

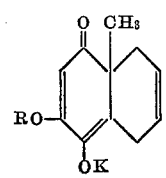

where R is an alkyl radical containing from 1 to 5 carbon atoms which comprises reacting in an alkyl alcohol solvent containing from 1 to 5 carbon atoms a 4a,5,8,8a-tetrahydro-2-alkoxy-4a-methyl-1,4-naphthoquinone of the structural formula where R is an alkyl radical containing from 1 to 5 carbon atoms with a potassium alkoxide containing from 1 to 5 carbon atoms at a temperature ranging from the freezing point of the reaction mixture to the boiling point of the reaction mixture.

4. The process of making the sodium derivative of 5,8-dihydro-4-hydroxy-3-methoxy-8a-methyl-1-naphthalenone of the structural formula which comprises reacting in an alkyl alcohol solvent containing from 1 to 5 carbon atoms dl-trans-4a,5,8,8a-tetrahydro-2-methoxy-4a-methyl-1,4-naphthoquinone with a sodium alkoxide containing from 1 to 5 carbon atoms at a temperature in the range of from about 15° C. to about 50° C.

5. The process of making the potassium derivative of 5,8-dihydro-4-hydroxy-3-methoxy-8a-methyl-1-naphthalenone of the structural formula which comprises reacting in an alkyl alcohol solvent containing from 1 to 5 carbon atoms dl-trans-4a,5,8,8a-tetrahydro-2-methoxy-4a-methyl-1,4-naphthoquinone with a potassium alkoxide containing from 1 to 5 carbon atoms at a temperature in the range of from about 15° C. to about 50° C.

References Cited in the file of this patent

UNITED STATES PATENTS

| Number | Name | Date |
|---|---|---|
| 1,891,168 | Lutteringhaus et al. | Dec. 13, 1932 |
| 1,984,511 | Anderson et al. | Dec. 18, 1934 |
| 2,379,494 | Orchin et al. | July 3, 1945 |

OTHER REFERENCES

Orchin et al., Jour. Am. Chem., vol. 8, pages 509–514 (1943).

Davis et al., Jour. Am. Chem. Soc., vol. 68, page 2745 (1946).